United States Patent
Tsai et al.

(10) Patent No.: US 12,429,902 B2
(45) Date of Patent: *Sep. 30, 2025

(54) MEMORY SYSTEM, MEMORY ACCESS INTERFACE DEVICE AND OPERATION METHOD THEREOF

(71) Applicant: REALTEK SEMICONDUCTOR CORPORATION, Hsinchu (TW)

(72) Inventors: Fu-Chin Tsai, Hsinchu (TW); Ger-Chih Chou, San Jose, CA (US); Chun-Chi Yu, Hsinchu (TW); Chih-Wei Chang, Hsinchu (TW); Min-Han Tsai, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 320 days.

This patent is subject to a terminal disclaimer.

(21) Appl. No.: 17/972,967

(22) Filed: Oct. 25, 2022

(65) Prior Publication Data
US 2024/0134410 A1 Apr. 25, 2024
US 2024/0231416 A9 Jul. 11, 2024

(51) Int. Cl.
*G06F 1/12* (2006.01)
*G06F 1/08* (2006.01)
*G06F 1/10* (2006.01)

(52) U.S. Cl.
CPC .................. *G06F 1/12* (2013.01); *G06F 1/08* (2013.01); *G06F 1/10* (2013.01)

(58) Field of Classification Search
CPC .................. G06F 1/12; G06F 1/08; G06F 1/10
See application file for complete search history.

(56) References Cited

U.S. PATENT DOCUMENTS 9,471,094 B1 * 10/2016 Brahmadathan .......... G06F 1/08
2008/0148092 A1 * 6/2008 Omori ....................... G06F 1/10
713/601

(Continued)

FOREIGN PATENT DOCUMENTS

TW 202143175 A 11/2021

OTHER PUBLICATIONS

OA letter of a counterpart TW application (appl. No. 112123948) mailed on Nov. 8, 2023. Summary of the TW OA letter: 1. Claims 1-10 are rejected as allegedly being unpatentable in view of cited reference 1 (TW 202143175A, also published as US20220262063A1). Correspondence bewteen claims of TW counterpart application and claims of US application: 1. Claims 1, 2-3, . . . , and 10 in TW counterpart application correspond to claims 1, 2-3, . . . , 8 and 11-12 in US application, respectively.

*Primary Examiner* — Paul Yen
(74) *Attorney, Agent, or Firm* — WPAT, PC (57) ABSTRACT

The present disclosure discloses a memory access interface device. A clock generation circuit generates reference signals. A transmitter transmits an output command and address signal to a memory device according to the reference signals. A signal training circuit executes a training process in a training mode that includes steps outlined below. A training signal is generated such that the training signal is transmitted as the output command and address signal. The training signal and the data signal generated by the memory device are compared to generate a comparison result indicating whether the data signal matches the training signal. The comparison result is stored. The clock generation circuit is controlled to modify a phase of at least one of the reference signals to be one of a plurality of under-test phases to execute a new loop of the training process until all the under-test phases are trained.

18 Claims, 6 Drawing Sheets

(56) References Cited

U.S. PATENT DOCUMENTS

| | | | |
|---|---|---|---|
| 2009/0244997 A1* | 10/2009 | Searles | G11C 7/1087 |
| | | | 365/194 |
| 2018/0121123 A1* | 5/2018 | Morris | G06F 3/0604 |
| 2019/0080730 A1* | 3/2019 | Lee | G11C 7/22 |
| 2022/0262063 A1 | 8/2022 | Szerszen et al. | |
| 2024/0310869 A1* | 9/2024 | Tsai | G06F 1/08 |

* cited by examiner

MEMORY SYSTEM, MEMORY ACCESS INTERFACE DEVICE AND OPERATION METHOD THEREOF

BACKGROUND OF THE INVENTION

1. Field of the Invention

The present disclosure relates to a memory system, a memory access interface device and a memory access interface device operation method thereof.

2. Description of Related Art

When memory devices, e.g., LVDDR memory devices, are mass-produced, corresponding parameters of each of the memory devices may vary due to the different conditions the devices meet during processing, packaging and the printed circuit boards that the devices are disposed.

The parameters of the memory devices related to timings of the access signals especially affect the accessing of the data. If the timing parameters are set to be the same among these memory devices, the yield may become low. As a result, a training process is required to obtain the preferable timing parameters of the access signals such that the accuracy of the accessing of the memory devices can be maintained.

SUMMARY OF THE INVENTION

In consideration of the problem of the prior art, an object of the present disclosure is to provide a memory system, a memory access interface device and a memory access interface device operation method thereof.

The present disclosure discloses a memory access interface device that includes a clock generation circuit, a transmitter and a signal training circuit. The signal training circuit is configured for performing the steps outlined below. For one of a plurality of loops of a training process in a training mode, a training signal is generated such that the transmitter selects the training signal to be transmitted as an output command and address signal to a memory device according to a plurality of timing reference signals generated according to the clock generation circuit each having a phase. A content of the training signal and the data signal generated by the memory device are compared to generate a comparison result indicating whether the data signal matches the content of the training signal. The comparison result is stored. The clock generation circuit is controlled to modify a phase of at least one of the timing reference signals to be one of a plurality of under-test phases to execute a new loop of the loops of the training process until all the under-test phases are trained.

The present disclosure also discloses a memory system that includes a memory access controller, a memory device and a memory access interface device. The memory access interface device includes a clock generation circuit, a transmitter and a signal training circuit. The signal training circuit is configured for performing the steps outlined below. For one of a plurality of loops of a training process in a training mode set by the memory access controller, a training signal is generated such that the transmitter selects the training signal to be transmitted as an output command and address signal to a memory device according to a plurality of timing reference signals generated by the clock generation circuit each having a phase. A content of the training signal and the data signal generated by the memory device are compared to generate a comparison result indicating whether the data signal matches the content of the training signal. The comparison result is stored. The clock generation circuit is controlled to modify a phase of at least one of the timing reference signals to be one of a plurality of under-test phases to execute a new loop of the loops of the training process until all the under-test phases are trained.

The present disclosure also discloses a memory access interface device operation method that includes the steps outlined below. For one of a plurality of loops of a training process in a training mode, a training signal is generated by a signal training circuit such that a transmitter selects the training signal to be transmitted as an output command and address signal to a memory device according to a plurality of timing reference signals generated according to a clock generation circuit each having a phase. A content of the training signal and a data signal generated by the memory device are compared to generate a comparison result indicating whether the data signal matches the content of the training signal. The comparison result is stored. The clock generation circuit is controlled to modify a phase of at least one of the timing reference signals to be one of a plurality of under-test phases to execute a new loop of the loops of the training process until all the under-test phases are trained.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a memory system, a memory access interface device and a memory access interface device operation method thereof.

Figure 1:
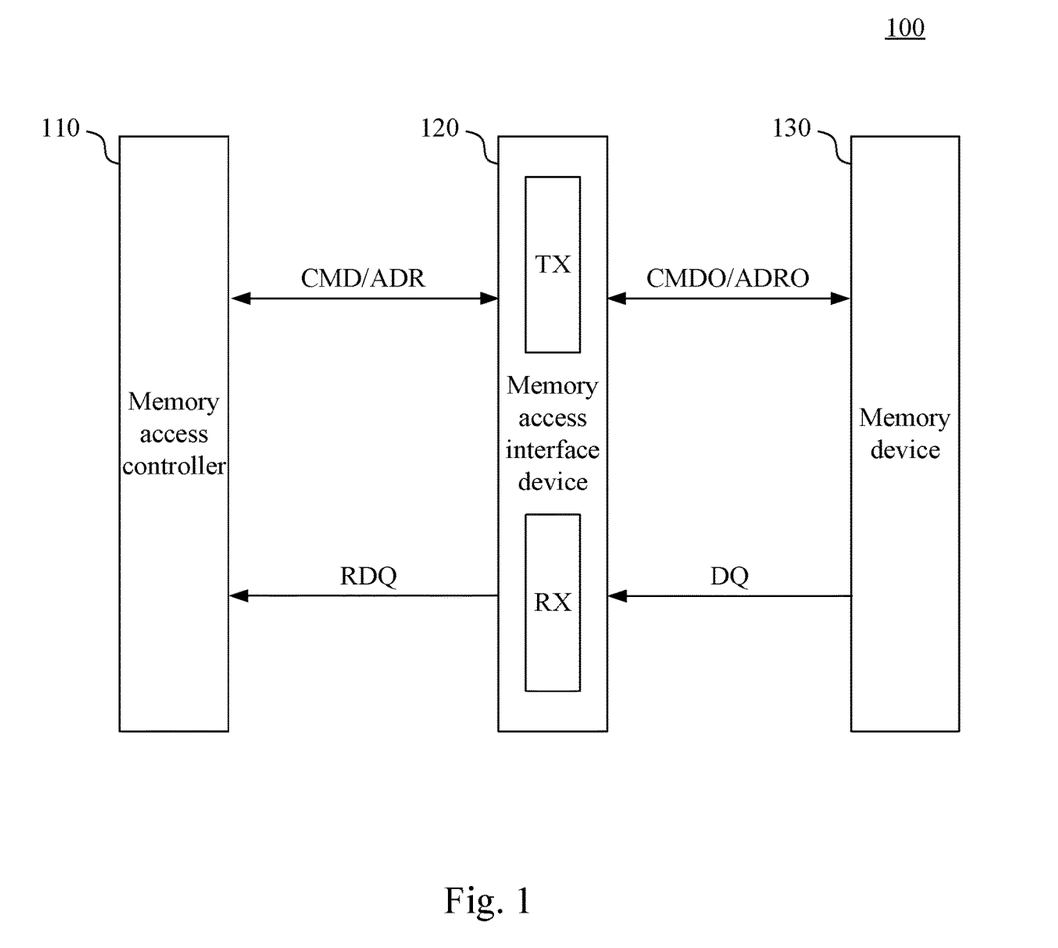
FIG. 1 illustrates a block diagram of a memory system according to an embodiment of the present invention.

Reference is now made to FIG. 1. FIG. 1 illustrates a block diagram of a memory system 100 according to an embodiment of the present invention. The memory system 100 includes a memory access controller 110, a memory access interface device 120 and a memory device 130.

The memory system 100 can be electrically coupled to other modules through such as, but not limited to a system bus (not illustrated). For example, the memory system 100 can be electrically coupled to a processor (not illustrated) through a system bus such that the processor can access the memory system 100.

In an embodiment, the memory access interface device 120 can be such as, but not limited to a physical layer circuit.

The memory device 130 is preferably a LPDDR memory device, e.g., a LPDDR4 memory.

External access signals, e.g. the access signals from the processor, can be received by the memory access controller 110 first and can be transmitted to the memory access interface device 120. Further, the access signals can be either transmitted from the memory access interface device 120 to the memory device 130 or used as a reference within the memory access interface device 120 to access the memory device 130.

The memory access interface device 120 substantially includes a transmitter TX and a receiver RX. As a result, different access signals may be transmitted depending on the operation of the transmitter TX and the receiver RX.

For the transmitter TX, the memory access controller 110 can receive and transmit the access signals including such as, but not limited to a command and address signal CMD/ADR to the memory access interface device 120.

The memory access interface device 120 applies latency on the access signals to generate output access signals. More specifically, the memory access interface device 120 applies latency on the command and address signal CMD/ADR to adjust the timing thereof to generate an output command and address signal CMDO/ADRO to the memory device 130.

For the receiver RX, the memory access controller 110 can receive the data signal DQ from the memory device 130 through a data transmission path and sample the data signal DQ to generate a read data signal RDQ to the memory access controller 110.

As a result, the internal data of the memory device 130 can thus be accessed according to the correct timing of the signals described above.

Figure 2:
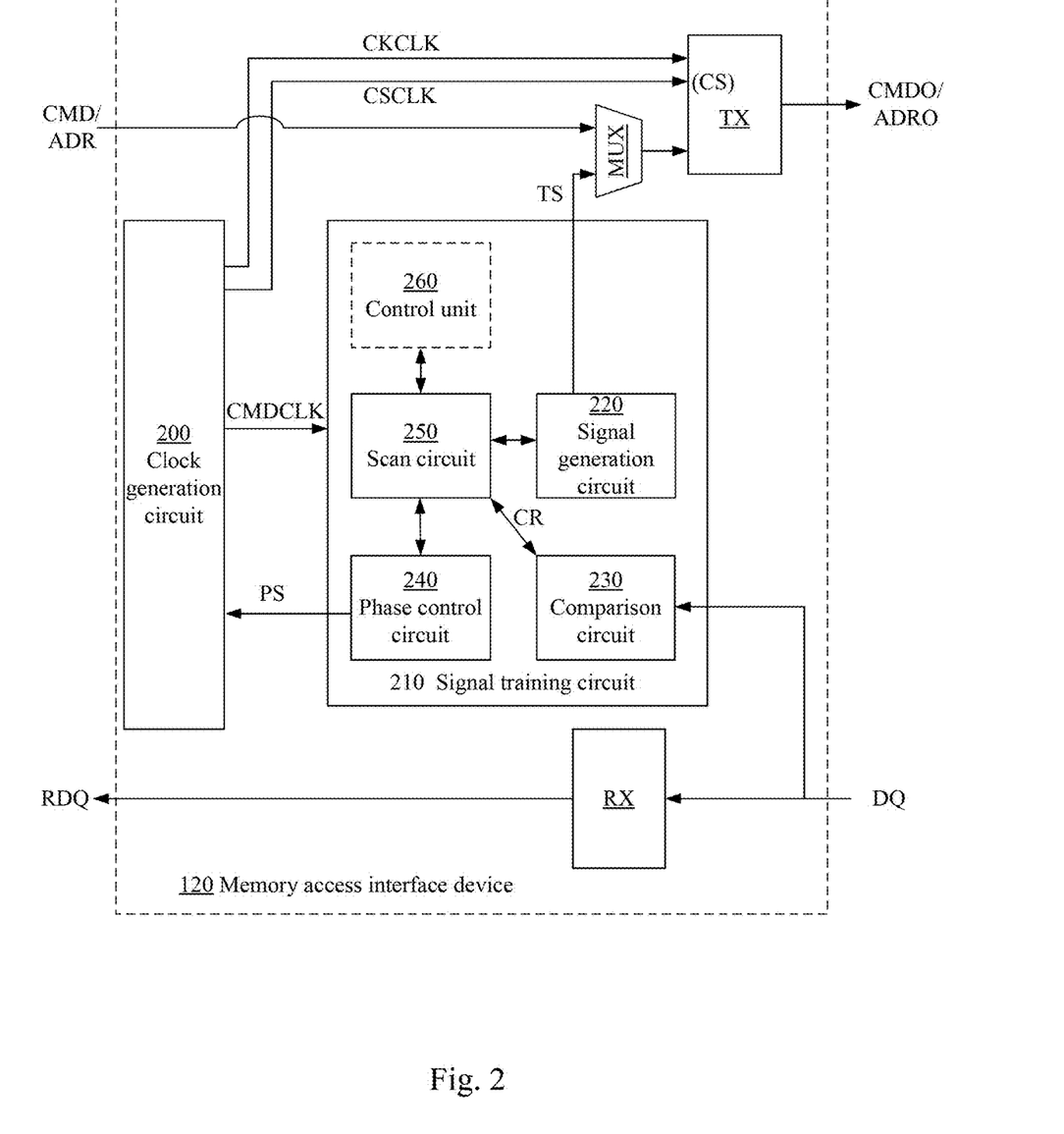
FIG. 2 illustrates a detailed block diagram of the memory access interface device in FIG. 1 according to an embodiment of the present invention.

Reference is now made to FIG. 2 at the same time. FIG. 2 illustrates a detailed block diagram of the memory access interface device 120 in FIG. 1 according to an embodiment of the present invention.

Besides the transmitter TX and the receiver RX, the memory access interface device 120 further includes a clock generation circuit 200 (abbreviated as CGC in FIG. 2) and a signal training circuit 210.

In an embodiment, the memory access interface device 120 is set to operate in either the training mode or an operation mode by the memory access controller 110. More specifically, in an embodiment, the processor that the memory system 100 is electrically coupled to may operate a software (not illustrated) to issue a command such that the memory access controller 110 receives the command and control the memory access interface device 120 to operate in either the training mode or the operation mode.

In the following paragraph, the operation of the memory access interface device 120 in the training mode is described first.

The clock generation circuit 200 is configured for generating a plurality of clock signals. In an embodiment, the clock signals include a clock signal CKCLK and a chip select clock signal CSCLK.

The transmitter TX is configured for transmitting the output command and address signal CMDO/ADRO to the memory device 130 according to a plurality of timing reference signals each having a phase generated according to the clock generation circuit 200, e.g., the clock signal CKCLK and the chip select signal CS.

In an embodiment, the clock signal CKCLK is provided by the clock generation circuit 200. The chip select signal CS is generated in the transmitter TX, e.g., by using a D flip-flop circuit therein, according to the chip select clock signal CSCLK provided by the clock generation circuit 200, in which the chip select clock signal CSCLK includes a plurality of consecutive clock pulses and the chip select signal CS includes a single signal pulse every predetermined time period.

In an embodiment, the signal training circuit 210 operates according to a command clock signal CMDCLK generated by the clock generation circuit 200. The signal training circuit 210 includes a signal generation circuit 220, a comparison circuit 230, a phase control circuit 240, a scan circuit 250 and a control unit 260.

The signal training circuit 210 executes a plurality of loops of a training process in the training mode. The training process executed by signal training circuit 210 is described in accompany with the description of the configuration and operation of the components included therein.

The signal generation circuit 220 is configured for generating a training signal TS such that the transmitter TX selects the training signal TS to be transmitted as the output command and address signal CMDO/ADRO, in which the output command and address signal CMDO/ADRO is transmitted to the memory device 130.

In an embodiment, the memory access interface device 120 further includes a multiplexer MUX coupled to the transmitter TX such that the transmitter TX selects the training signal TS to be transmitted as the output command and address signal CMDO/ADRO in the training mode by using the multiplexer MUX.

The comparison circuit 230 is configured for comparing a content of the training signal TS and the data signal DQ generated by the memory device 130 to generate a comparison result CR indicating whether the data signal DQ matches the training signal TS.

In an embodiment, the comparison circuit 230 receives the data signal DQ directly from the data transmission path without passing through the receiver RX in the training mode since no data strobe signal is transmitted from the memory device 130 in the training mode.

The phase control circuit 240 is configured for generating a phase control signal PS to control the clock generation circuit 200 to modify the phase of at least one of the clock signals, e.g., at least one of the clock signal CKCLK and the chip select clock signal CSCLK, so as to modify the phase of at least one of the timing reference signals, e.g., at least one of the clock signal CKCLK and the chip select signal CS.

The scan circuit 250 is configured for controlling the signal generation circuit 220 and the phase control circuit 240 to execute the loops of the training process. When a loop of the training process is finished, the phase of at least one of the clock signal CKCLK and the chip select signal CS is modified to be one of a plurality of under-test phases to execute a new loop of the loops of the training process until all the under-test phases are trained.

The scan circuit 250 is further configured for storing the comparison result CR in each of the loops of the training process.

The control unit 260 is configured for providing test data for generating the training signal TS such that the scan circuit 250 controls the signal generation circuit 220 to generate the training signal TS accordingly. Further, the control unit 260 is configured for accessing the comparison result CR stored by the scan circuit 250 to determine a preferable clock phase of the clock signal CKCLK and a preferable chip select phase of the chip select signal CS (generated according to the chip select clock signal CSCLK).

In an embodiment, the control unit 260 can be implemented by using hardware disposed in the signal training circuit 210. In another embodiment, the control unit 260 can be implemented by using software operated by the processor coupled to the memory system 100. Under the condition that the control unit 260 is implemented by using software, the control unit 260 may provide the test data to a register in the signal training circuit 210 for the scan circuit 250 to access, the scan circuit 250 may store the comparison result CR in another register for the control unit 260 to access.

The loops of the training process performed by the signal training circuit 210 are described in detail below.

Figure 3:
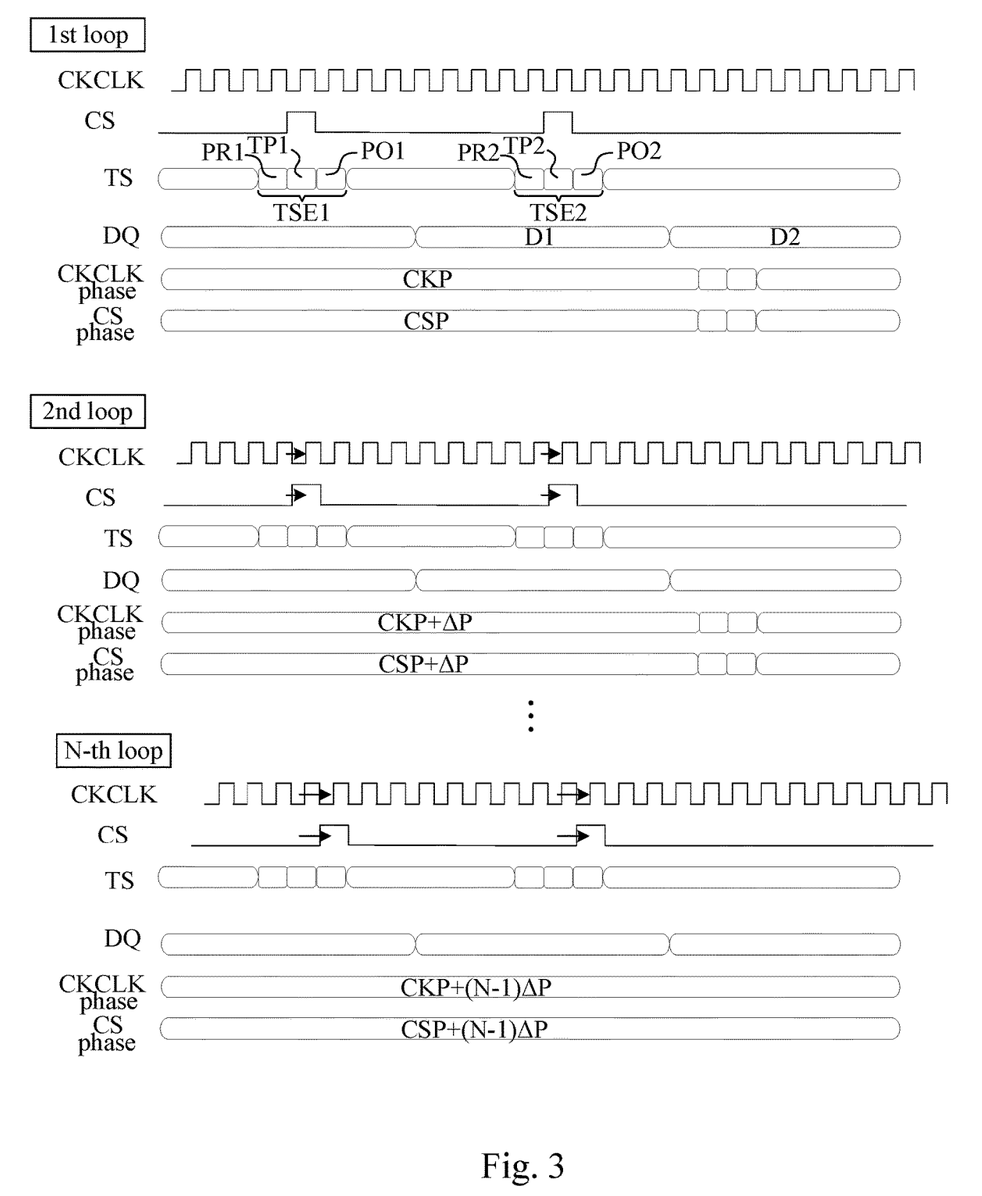
FIG. 3 illustrates a diagram of various signals related to the operation of the memory access interface device in the training mode according to an embodiment of the present invention.

FIG. 3 illustrates a diagram of various signals related to the operation of the memory access interface device 120 in the training mode according to an embodiment of the present invention.

As illustrated in FIG. 3, N loops of the training process are exemplarily illustrated. A first stage process of the training process is performed in FIG. 3, in which both the phases of the clock signal CKCLK and the chip select signal CS are modified in each loop of the first stage process. As a result, each of the loops of the training process corresponds to one of N under-test phases of the clock signal CKCLK and the chip select signal CS, N being a positive integer.

In the present embodiment, in the first loop of the first stage process, the phase of the clock signal CKCLK has a predetermined phase CKP and the phase of the chip select signal CS has a predetermined phase CSP.

The training signal TS includes a first training sequence TSE1 and a second training sequence TSE2.

The first training sequence TSE1 includes a first preamble section PR1, a first training pattern TP1 and a first postamble section PO1 each having a time length that is a time period of the clock signal CKCLK. In an embodiment, each of the first preamble section PR1 and the first postamble section PO1 is different from the first training pattern TP1.

Similarly, the second training sequence TSE2 includes a second preamble section PR2, a second training pattern TP2 and a second postamble section PO2 each having a time length that is a time period of the clock signal CKCLK. In an embodiment, each of the second preamble section PR2 and the second postamble section PO2 is different from the second training pattern TP2.

In an embodiment, the second training pattern TP2 is an inverse of the first training pattern TP1. For example, the first training pattern TP1 can be 0x2A (which is 101010) and the second training pattern TP2 can be 0x15 (which is 010101).

The transmitter TX selects the training signal TS to be transmitted as the output command and address signal CMDO/ADRO according to the clock signal CKCLK and the chip select signal CS, in which the clock signal CKCLK indicates the timing of the transmission and the chip select signal CS indicates that such a output command and address signal CMDO/ADRO is valid.

Corresponding to the first loop, the data signal DQ that includes a first part data D1 and a second part data D2 is subsequently received.

The comparison circuit 230 in FIG. 2 can therefore compare the content of the training signal TS and the data signal DQ. More specifically, the comparison circuit 230 compares the first training pattern TP1 with the first part data D1 of the data signal DQ to generate a first part result of the comparison result CR and compares the second training pattern TP2 with the second part data D2 of the data signal DQ to generate the second part result of the comparison result CR.

When the first part data D1 matches the first training pattern TP1, the first part result of the comparison result CR indicates that the data signal DQ matches the content of the training signal TS. When the first part data D1 does not match the first training pattern TP1, e.g., the first part data D1 includes the content of either first preamble section PR1 or the first postamble section PO1, the first part result of the comparison result CR indicates that the data signal DQ does not match the content of the training signal TS.

Similarly, when the second part data D2 matches the second training pattern TP2, the second part result of the comparison result CR indicates that the data signal DQ matches the content of the training signal TS. When the second part data D2 does not match the second training pattern TP2, e.g., the second part data D2 includes the content of either second preamble section PR2 or the second postamble section PO2, the second part result of the comparison result CR indicates that the data signal DQ does not match the content of the training signal TS.

It is appreciated that in some embodiments, the training signal TS may include only one training sequence such that the comparison result CR only includes a single part result. The present invention is not limited thereto.

For the second loop of the first stage process, the phase of the clock signal CKCLK is modified to be a next under-test phase, which is a sum of the predetermined phase CKP and a unit phase $\Delta P$. The phase of the chip select clock signal CSCLK is modified to be a next under-test phase, which is a sum of the predetermined phase CSP and the unit phase $\Delta P$.

The transmission of the training signal TS, the receiving of the data signal DQ and the comparison made between the training signal TS and the data signal DQ in the second loop of the first stage process is identical to the first loop of the first stage process. The detail is not further described herein.

As a result, each of the other loops of the first stage process can be performed subsequently until the N-th loop of the first stage process is performed. In the N-th loop of the first stage process, the phase of the clock signal CKCLK is modified to be a sum of the predetermined phase CKP and N−1 unit phases $\Delta P$, which is expressed as CKP+(N−1)$\Delta P$. The phase of the chip clock select signal CSCLK is modified to be a sum of the predetermined phase CSP and N−1 unit phases $\Delta P$, which is expressed as CSP+(N−1)$\Delta P$.

It is appreciated that the number of the under-test phases, which corresponds to the number of the loops of the first stage process to be performed, is determined according to a required accuracy within a clock period of the clock signal CKCLK.

For example, the time period of the clock signal CKCLK can be divided into 8 phases each corresponding to the unit phase $\Delta P$ described above such that 8 loops of the first stage process are performed. When a higher accuracy is required, the time period of the clock signal CKCLK can be divided into 16 phases each corresponding to the unit phase $\Delta P$ described above such that 16 loops of the first stage process are performed.

Since the phase of the chip select signal CS is modified along with the clock signal CKCLK in the embodiment of FIG. 3, the chip select signal CS does not affect the transmission of the output command and address signal CMDO/ADRO.

Based on the comparison result CR from each of the loops of the first stage process stored by the scan circuit 250 in FIG. 2, one of the under-test phases of the clock signal CKCLK is determined to be valid when the corresponding comparison result CR indicates that the data signal DQ matches the content of the training signal TS. A preferable clock phase of the clock signal CKCLK can be obtained according to the valid under-test phases. For example, a central phase of the valid phases of the clock signal CKCLK can be selected as the preferable clock phase of the clock signal CKCLK.

Figure 4:
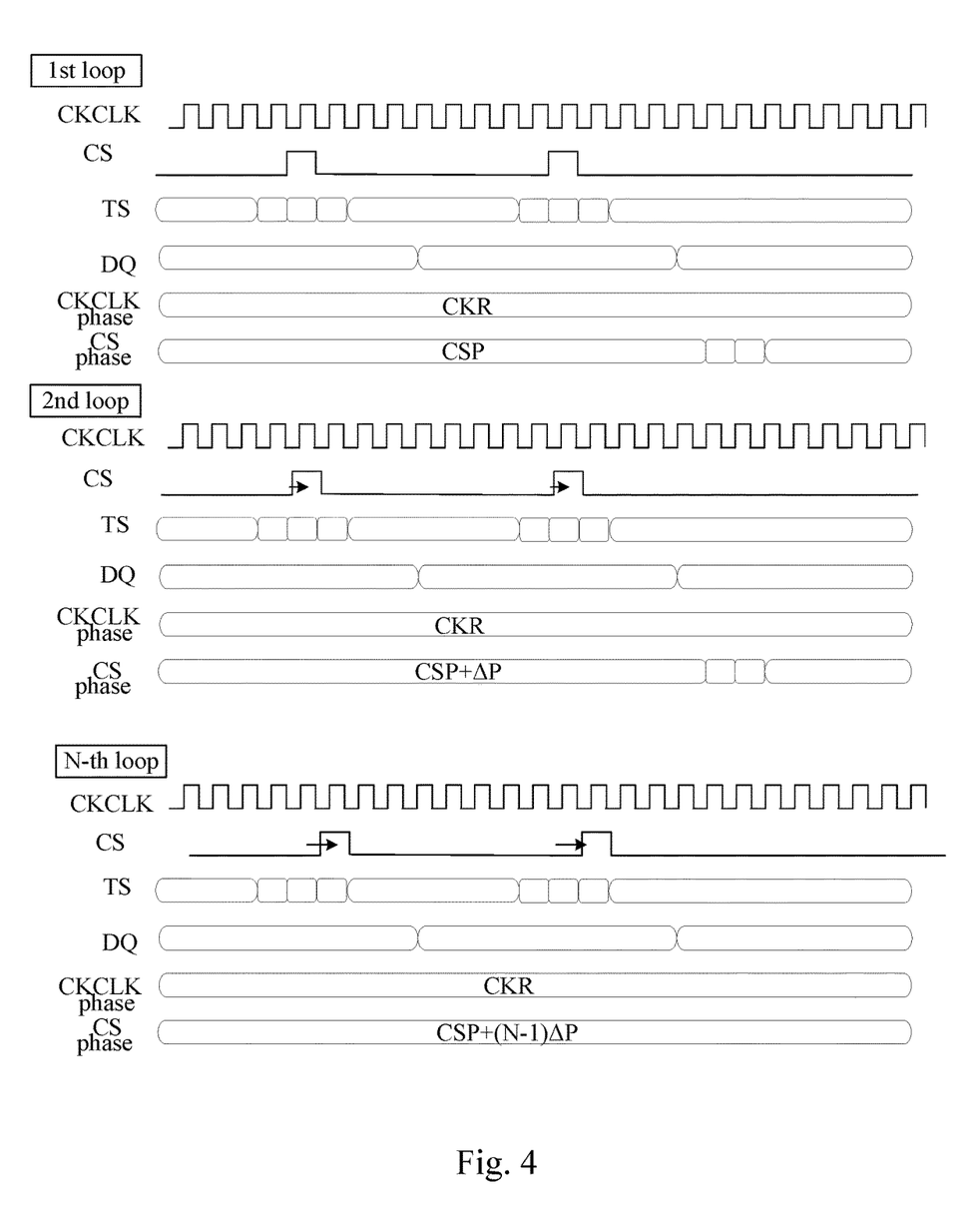
FIG. 4 illustrates a diagram of various signals related to the operation of the memory access interface device in the training mode according to another embodiment of the present invention.

FIG. 4 illustrates a diagram of various signals related to the operation of the memory access interface device 120 in the training mode according to another embodiment of the present invention.

As illustrated in FIG. 4, N loops of the training process are exemplarily illustrated. A second stage process of the training process is performed in FIG. 4, in which only the phases of the chip select signal CS (generated according to the chip select clock signal CSCLK) is modified in each loop of the training process.

In an embodiment, the second stage process is performed after the first stage process is finished being performed, in which the clock signal CKCLK is set to be the preferable clock phase CKR when the first stage process is finished being performed.

Each of the loops of the second stage process corresponds to one of N under-test phases of the chip select clock signal CSCLK, N being a positive integer, in which the phase of chip select clock signal CSCLK has the predetermined phase CSP in the first loop of the second stage process and the phase of the chip select clock signal CSCLK is modified to be a sum of the predetermined phase CSP and N−1 unit phases ΔP in the N-th loop of the second stage process, which is expressed as CSP+(N−1)ΔP.

The transmission of the training signal TS, the receiving of the data signal DQ and the comparison made between the training signal TS and the data signal DQ in each of the loops of the second stage process in FIG. 4 is identical to each of the loops of the first stage process in FIG. 3. The detail is not further described herein.

Based on the comparison result CR from each of the loops of the second stage process stored by the scan circuit 250 in FIG. 2, one of the under-test phases of the clock signal CKCLK is determined to be valid when the corresponding comparison result CR indicates that the data signal DQ matches the content of the training signal TS. A preferable clock phase of the chip select clock signal CSCLK can be obtained according to the valid under-test phases. For example, a central phase of the valid phases of the chip select clock signal CSCLK can be selected as the preferable clock phase of the chip select clock signal CSCLK.

After the training process is performed, the memory access interface device 120 is set to operate in the operation mode by the memory access controller 110 in FIG. 1.

In the operation mode, the transmitter TX selects the command and address signal CMD/ADR transmitted by the memory access controller 110 to be transmitted as the output command and address signal CMDO/ADRO by using the multiplexer MUX. The transmission of the output command and address signal CMDO/ADRO is performed according to the preferable phases of the clock signal CKCLK and the chip select clock signal CSCLK. As a result, the memory device 130 can be accessed by using the access signal, e.g., the output command and address signal CMDO/ADRO having the preferable timing.

The memory access interface device 120 in the present invention can perform training on the timing reference signals by modifying the phases thereof and determine whether the phases are valid according to the comparison result between the content of the transmitted training signal and the data signal returned by the memory device. The preferable phases of the timing reference signals can be further obtained according to the valid phases.

Figure 5:
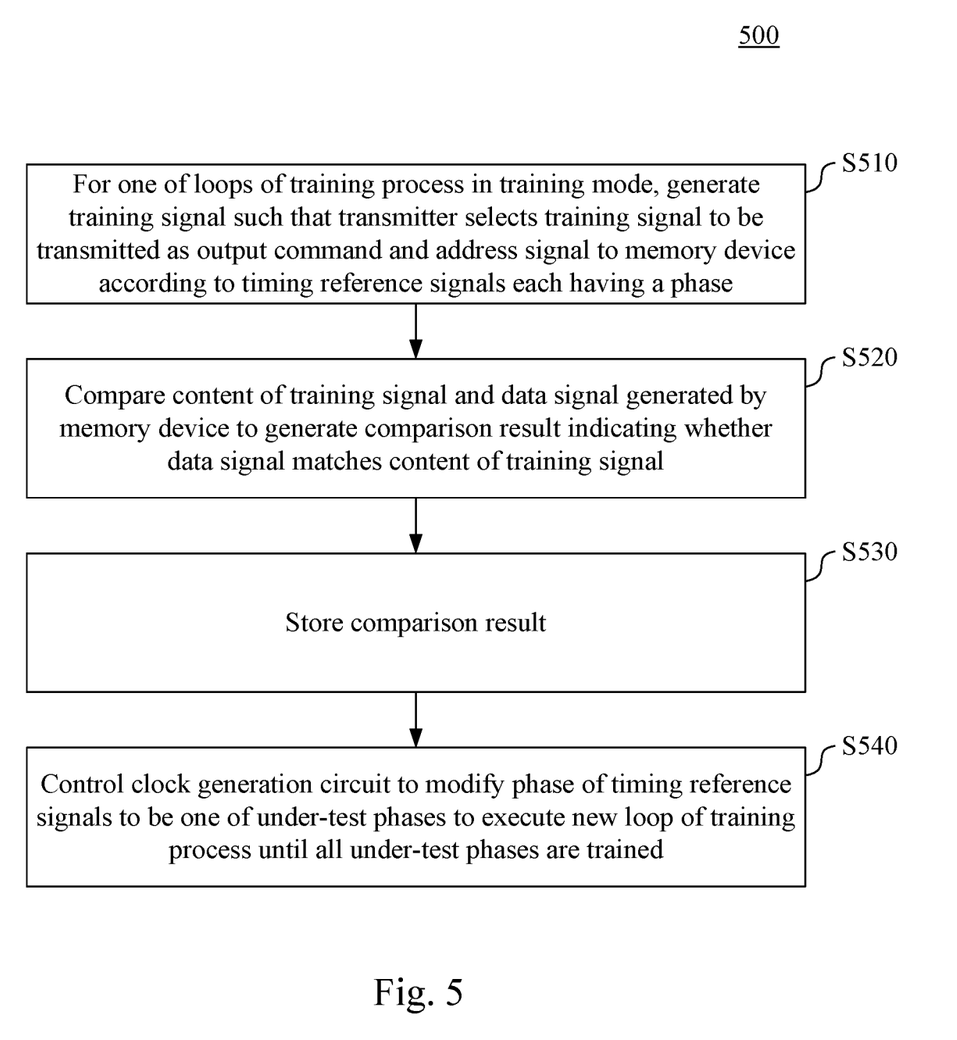
FIG. 5 illustrates a flow chart of a memory access interface device operation method according to an embodiment of the present invention.

Reference is now made to FIG. 5. FIG. 5 illustrates a flow chart of a memory access interface device operation method 500 according to an embodiment of the present invention.

In addition to the apparatus described above, the present disclosure further provides the memory access interface device operation method 500 that can be used in such as, but not limited to, the memory access interface device 120 in FIG. 2. As illustrated in FIG. 5, an embodiment of the memory access interface device operation method 500 includes the following steps.

In step S510, for one of the loops of the training process in the training mode, the training signal TS is generated by the signal training circuit 210 such that the transmitter TX selects the training signal TS to be transmitted as the output command and address signal CMO/ADRO to the memory device 130 according to the timing reference signals generated by the clock generation circuit 200 each having a phase.

In step S520, the content of the training signal TS and the data signal DQ generated by the memory device 130 are compared to generate the comparison result CR indicating whether the data signal DQ matches the content of the training signal TS.

In step S530, the comparison result CR is stored.

In step S540, the clock generation circuit 200 is controlled to modify the phase of at least one of the timing reference signals to be one of the under-test phases to execute a new loop of the loops of the training process until all the under-test phases are trained.

Figure 6:
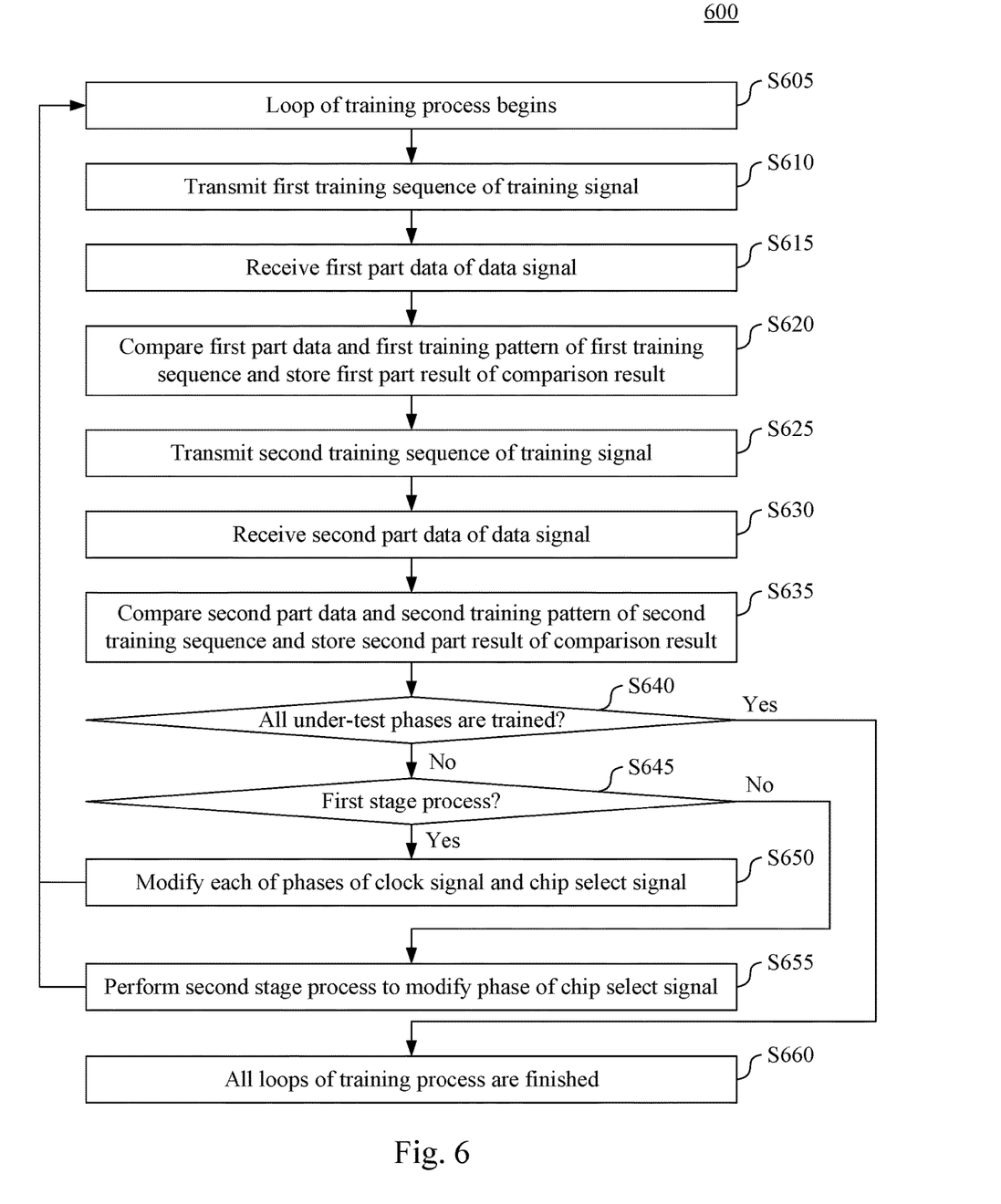
FIG. 6 illustrates a more detailed flow chart of a memory access interface device operation method according to an embodiment of the present invention.

Reference is now made to FIG. 6. FIG. 6 illustrates a more detailed flow chart of a memory access interface device operation method 600 according to an embodiment of the present invention. The memory access interface device operation method 600 can be used in the embodiment corresponding to FIG. 3 and FIG. 4.

In step S605, a loop of the training process begins.

In step S610, the first training sequence TSE1 of the training signal TS is transmitted.

In step S615, the first part data D1 of the data signal DQ is received.

In step S620, the first part data D1 and the first training pattern TP1 of the first training sequence TSE1 are compared and the first part result of the comparison result CR is stored.

In step S625, the second training sequence TSE2 of the training signal TS is transmitted.

In step S630, the second part data D2 of the data signal DQ is received.

In step S635, the second part data D2 and the second training pattern TP2 of the second training sequence TSE2 are compared and the second part result of the comparison result CR is stored.

In step S640, whether all the under-test phases are trained or not is determined.

In step S645, when not all the under-test phases are trained, whether the first stage process is performed is determined.

In step S650, when the first stage process is performed, each of the phases of the clock signal CKCLK and the chip select signal CS is modified to one of the under-test phases, in which the phase of the chip select signal CS is modified by modifying the phase of the chip select clock signal CSCLK. The flow goes to step S605 such that a new loop of the training process begins.

In step S655, when the first stage process is not performed, the second stage process is performed such that the phase of the chip select signal CS is modified to one of the under-test phases, in which the phase of the chip select signal CS is modified by modifying the phase of the chip select clock signal CSCLK. The flow goes to step S605 such that a new loop of the training process begins.

In step S660, when all the under-test phases are trained, all the loops of the training process are finished.

It is appreciated that the embodiments described above are merely an example. In other embodiments, it should be appreciated that many modifications and changes may be made by those of ordinary skill in the art without departing, from the spirit of the invention.

In summary, the memory system, the memory access interface device and the memory access interface device operation method thereof perform training on the timing reference signals by modifying the phases thereof and determine whether the phases are valid according to the comparison result between the content of the transmitted training signal and the data signal returned by the memory device. The preferable phases of the timing reference signals can be further obtained according to the valid phases.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A memory access interface device comprising:
a clock generation circuit;
a transmitter; and
a signal training circuit configured for:
for one of a plurality of loops of a training process in a training mode, generating a training signal such that the transmitter selects the training signal to be transmitted as an output command and address signal to a memory device according to a plurality of timing reference signals generated according to the clock generation circuit each having a phase, wherein the timing reference signals comprise a clock signal and a chip select signal, in which the clock signal is provided by the clock generation circuit and the chip select signal is generated in the transmitter according to a chip select clock signal provided by the clock generation circuit;
comparing a content of the training signal and a data signal generated by the memory device to generate a comparison result indicating whether the data signal matches the content of the training signal, wherein no data strobe signal is transmitted from the memory device such that the data signal is received directly from the memory device in the training mode through a data transmission path without passing through a receiver;
storing the comparison result; and
controlling the clock generation circuit to modify the phase of at least one of the timing reference signals to be one of a plurality of under-test phases to execute a new loop of the loops of the training process until all the under-test phases are trained;

wherein the signal training circuit is further configured for:
controlling the clock generation circuit to modify the phase of each of the clock signal and the chip select signal in a first stage process of the training process until all the under-test phases are trained;
determining one of the under-test phases of the clock signal is valid when the corresponding comparison result indicates that the data signal matches the content of the training signal;
determining a preferable clock phase of the clock signal according to the valid under-test phases;
setting the clock signal to be at the preferable clock phase and controlling the clock generation circuit to modify the phase of only the chip select signal in a second stage process of the training process until all the under-test phases are trained;
determining one of the under-test phases of the chip select signal is valid when the corresponding comparison result indicates that the data signal matches the content of the training signal; and
determining a preferable chip select phase of the chip select signal according to the valid under-test phases.

2. The memory access interface device of claim 1, wherein the memory access interface device is set to operate in an operation mode by a memory access controller such that the transmitter selects a command and address signal transmitted by the memory access controller to be transmitted as the output command and address signal in the operation mode according to the preferable clock phase of the clock signal and the preferable chip select phase.

3. The memory access interface device of claim 2, further comprising a multiplexer coupled to the transmitter such that the transmitter selects the training signal to be transmitted as the output command and address signal in the training mode and selects the command and address signal to be transmitted as the output command and address signal in the operation mode by using the multiplexer.

4. The memory access interface device of claim 1, wherein the signal training circuit comprises:
a signal generation circuit configured for generating the training signal;
a comparison circuit configured for comparing the content of the training signal and the data signal to generate the comparison result;
a phase control circuit configured for generating a phase control signal to control the clock generation circuit to modify the phase of at least one of a plurality of clock signals to further modify the phase of at least one of the timing reference signals;
a scan circuit configured for controlling the signal generation circuit and the phase control circuit to execute the loops of the training process and storing the comparison result; and
a control unit configured for providing test data for generating the training signal and for accessing the comparison result to determine the preferable clock phase of the clock signal and the preferable chip select phase of the clock select signal.

5. The memory access interface device of claim 4, wherein the control unit is implemented by using software operated by a processor.

6. The memory access interface device of claim 1, wherein a number of the under-test phases is determined according to a required accuracy within a clock period of the clock signal.

7. The memory access interface device of claim 1, wherein the training signal comprises a first training sequence and a second training sequence, the first training sequence comprising a first preamble section, a first training pattern and a first postamble section and the second training sequence comprising a second preamble section, a second training pattern and a second postamble section, each of the first preamble section and the first postamble section being different from the first training pattern, each of the second preamble section and the second postamble section being different from the second training pattern and the second training pattern is an inverse of the first training pattern;
  wherein the first training pattern is compared with a first part data of the data signal to generate a first part result of the comparison result and the second training pattern is compared with a second part data of the data signal to generate a second part result of the comparison result;
  wherein the first part result of the comparison result indicates that the data signal matches the content of the training signal when the first part data matches the first training pattern, and the second part result of the comparison result indicates that the data signal matches the content of the training signal when the second part data matches the second training pattern.

8. The memory access interface device of claim 1, wherein the signal training circuit operates according to a command clock signal generated by the clock generation circuit.

9. The memory access interface device of claim 1, wherein the memory device is a LPDDR4 memory device.

10. A memory system comprising:
  a memory access controller;
  a memory device; and
  a memory access interface device comprising:
    a clock generation circuit; and
    a transmitter; and
    a signal training circuit configured for executing a training process in a training mode set by the memory access controller, wherein the training process comprises:
      for one of a plurality of loops of the training process in a training mode set by the memory access controller, generating a training signal such that the transmitter selects the training signal to be transmitted as an output command and address signal to a memory device according to a plurality of timing reference signals generated according to the clock generation circuit each having a phase, wherein the timing reference signals comprise a clock signal and a chip select signal, in which the clock signal is provided by the clock generation circuit and the chip select signal is generated in the transmitter according to a chip select clock signal provided by the clock generation circuit;
      comparing a content of the training signal and a data signal generated by the memory device to generate a comparison result indicating whether the data signal matches the content of the training signal, wherein no data strobe signal is transmitted from the memory device such that the data signal is received directly from the memory device in the training mode through a data transmission path without passing through a receiver;
      storing the comparison result; and
      controlling the clock generation circuit to modify the phase of at least one of the timing reference signals to be one of a plurality of under-test phases to execute a new loop of the loops of the training process until all the under-test phases are trained;
  wherein the signal training circuit is further configured for:
    controlling the clock generation circuit to modify the phase of each of the clock signal and the chip select signal in a first stage process of the training process until all the under-test phases are trained;
    determining one of the under-test phases of the clock signal is valid when the corresponding comparison result indicates that the data signal matches the content of the training signal;
    determining a preferable clock phase of the clock signal according to the valid under-test phases;
    setting the clock signal to be at the preferable clock phase and controlling the clock generation circuit to modify the phase of only the chip select signal in a second stage process of the training process until all the under-test phases are trained;
    determining one of the under-test phases of the chip select signal is valid when the corresponding comparison result indicates that the data signal matches the content of the training signal; and
    determining a preferable chip select phase of the chip select signal according to the valid under-test phases.

11. A memory access interface device operation method, comprising:
  for one of a plurality of loops of a training process in a training mode, generating a training signal by a signal training circuit such that a transmitter selects the training signal to be transmitted as an output command and address signal to a memory device according to a plurality of timing reference signals generated by a clock generation circuit each having a phase, wherein the timing reference signals comprise a clock signal and a chip select signal, in which the clock signal is provided by the clock generation circuit and the chip select signal is generated in the transmitter according to a chip select clock signal provided by the clock generation circuit;
  comparing a content of the training signal and a data signal generated by the memory device by the signal training circuit to generate a comparison result indicating whether the data signal matches the content of the training signal, wherein no data strobe signal is transmitted from the memory device such that the data signal is received directly from the memory device in the training mode through a data transmission path without passing through a receiver;
  storing the comparison result by the signal training circuit; and
  controlling the clock generation circuit by the signal training circuit to modify the phase of at least one of the timing reference signals to be one of a plurality of under-test phases to execute a new loop of the loops of the training process until all the under-test phases are trained;
  wherein the memory access interface device operation method further comprises:
    controlling the clock generation circuit to modify the phase of each of the clock signal and the chip select signal in a first stage process of the training process until all the under-test phases are trained;
    determining one of the under-test phases of the clock signal is valid when the corresponding comparison result indicates that the data signal matches the content of the training signal;

determining a preferable clock phase of the clock signal according to the valid under-test phases;

setting the clock signal to be at the preferable clock phase and controlling the clock generation circuit to modify the phase of only the chip select signal in a second stage process of the training process until all the under-test phases are trained;

determining one of the under-test phases of the chip select signal is valid when the corresponding comparison result indicates that the data signal matches the content of the training signal; and determining a preferable chip select phase of the chip select signal according to the valid under-test phases.

12. The memory access interface device operation method of claim 11, further comprising:

set the memory access interface device to operate in an operation mode by a memory access controller such that the transmitter selects a command and address signal transmitted by the memory access controller to be transmitted as the output command and address signal in the operation mode according to the preferable clock phase of the clock signal and the preferable chip select phase.

13. The memory access interface device operation method of claim 12, wherein the signal training circuit comprises:

selecting the training signal to be transmitted as the output command and address signal in the training mode and selecting the command and address signal to be transmitted as the output command and address signal in the operation mode by the transmitter by using a multiplexer coupled to the transmitter.

14. The memory access interface device operation method of claim 11, further comprising:

generating the training signal by a signal generation circuit of the signal training circuit;

comparing the content of the training signal and the data signal to generate the comparison result by a comparison circuit of the signal training circuit;

generating a phase control signal to control the clock generation circuit to modify the phase of at least one of a plurality of clock signals to further modify the phase of at least one of the timing reference signals by a phase control circuit of the signal training circuit;

controlling the signal generation circuit and the phase control circuit to execute the loops of the training process and storing the comparison result by a scan circuit of the signal training circuit; and providing test data for generating the training signal and accessing the comparison result to determine the preferable clock phase of the clock signal and the preferable chip select phase of the clock select signal by a control unit of the signal training circuit.

15. The memory access interface device operation method of claim 14, wherein the control unit is implemented by using software operated by a processor.

16. The memory access interface device operation method of claim 11, wherein a number of the under-test phases is determined according to a required accuracy within a clock period of the clock signal.

17. The memory access interface device operation method of claim 11, wherein the training signal comprises a first training sequence and a second training sequence, the first training sequence comprising a first preamble section, a first training pattern and a first postamble section and the second training sequence comprising a second preamble section, a second training pattern and a second postamble section, each of the first preamble section and the first postamble section being different from the first training pattern, each of the second preamble section and the second postamble section being different from the second training pattern and the second training pattern is an inverse of the first training pattern, the memory access interface device operation method further comprises:

comparing the first training pattern with a first part data of the data signal to generate a first part result of the comparison result and comparing the second training pattern with a second part data of the data signal to generate a second part result of the comparison result;

wherein the first part result of the comparison result indicates that the data signal matches the content of the training signal when the first part data matches the first training pattern, and the second part result of the comparison result indicates that the data signal matches the content of the training signal when the second part data matches the second training pattern.

18. The memory access interface device operation method of claim 11, further comprising:

operating the signal training circuit according to a command clock signal generated by the clock generation circuit.

* * * * *